United States Patent
Colgan et al.

[11] Patent Number: 5,818,563
[45] Date of Patent: Oct. 6, 1998

[54] SUBSTRATE STRUCTURE AND ASSEMBLY METHOD FOR REDUCED SPATIAL LIGHT MODULATOR SIZE

[75] Inventors: Evan George Colgan, Chestnut Ridge; Robert Lee Melcher, Mt. Kisco, both of N.Y.; Teruhiro Nakasogi, Shiga-ken, Japan; Chandrasekhar Narayan, Hopewell Junction, N.Y.; James Lawrence Sanford, Chappaqua, N.Y.; Kei-Hsiung Yang, Katonah, N.Y.

[73] Assignee: IBM Corporation, Armonk, N.Y.

[21] Appl. No.: 926,152

[22] Filed: Sep. 9, 1997

Related U.S. Application Data

[63] Continuation of Ser. No. 685,259, Jul. 23, 1996, abandoned.

[51] Int. Cl.$^6$ .................. G02F 1/1345; G02F 1/1339; G02F 1/1333; G02F 1/13
[52] U.S. Cl. .................. 349/158; 349/151; 349/152; 349/153; 349/149; 349/156; 349/160; 349/187; 349/190
[58] Field of Search .................. 349/158, 160, 349/156, 187, 190, 153, 116, 149, 151, 152

[56] References Cited

U.S. PATENT DOCUMENTS

| | | | |
|---|---|---|---|
| 3,954,325 | 5/1976 | Borden | 349/158 |
| 4,474,432 | 10/1984 | Takamatsu et al. | 349/158 |
| 4,693,561 | 9/1987 | Ashley | 350/336 |
| 4,741,602 | 5/1988 | Tsutomu et al. | 350/356 |
| 4,954,789 | 9/1990 | Sampsell | 330/4.3 |
| 5,130,830 | 7/1992 | Fukushima et al. | 359/72 |
| 5,168,383 | 12/1992 | Iwaki et al. | 359/71 |
| 5,170,283 | 12/1992 | O'Brien et al. | 359/291 |
| 5,235,445 | 8/1993 | Yoshinori et al. | 359/52 |
| 5,293,511 | 3/1994 | Poradish et al. | 257/434 |
| 5,384,649 | 1/1995 | Takimoto et al. | 359/67 |
| 5,428,711 | 6/1995 | Akiyama et al. | 395/25 |

*Primary Examiner*—William L. Sikes
*Assistant Examiner*—Julie Ngo
*Attorney, Agent, or Firm*—Anne Vachon Dougherty; Douglas W. Cameron

[57] ABSTRACT

A spatial light modulator designed to use a minimum area on the surface of a silicon substrate. This invention comprises a silicon substrate on a back plate with a glass cover that is used to seal liquid crystal between the glass cover and the silicon substrate. Most importantly, the glue seal formed to contain the liquid crystal material is between the cover glass plate and the Si substrate on only one side and the back plate on the remaining three sides. This structure allows a smaller semiconductor substrate to be used.

17 Claims, 2 Drawing Sheets

SUBSTRATE STRUCTURE AND ASSEMBLY METHOD FOR REDUCED SPATIAL LIGHT MODULATOR SIZE

This is a continuation of application Ser. No. 08/685,259 filed on Jul. 23, 1996 now abandoned.

DESCRIPTION

1. Technical Field

This invention discloses a spatial light modulator which is designed to use up a minimum surface area on a silicon substrate. More specifically, by sealing the glass cover on the silicon substrate in a special way, the area needed on the surface of the silicon substrate is greatly reduced.

2. Description of the Prior Art

Typically, for a reflective or transmissive Spatial Light Modulator (SLM), the liquid crystal (LC) cell is formed by gluing a cover glass to the substrate containing the electrical circuitry and injecting LC into the gap (1). For SLMs fabricated with semiconducting wafers as substrates, a significant portion of the Si substrate or wafer is occupied by the extra area needed for the glue seal. This limits the number of Si substrates that can be fabricated per wafer. Typically, for spatial light modulators used for direct view liquid crystal (LC) displays, the liquid crystal layer is confined by a glue seal between a substrate containing the addressing circuitry and a cover glass with an Indium-Tin oxide (ITO) transparent counter electrode. A minimum spacing is needed between the glue seal and active elements to avoid potential contamination of the liquid crystal by the glue. This contamination is believed to be due to diffusion of glue components into the liquid crystal and results in a reduced resistivity, and hence lower charge retention time. The required separation between the glue seal and active elements is approximately 2.5 mm. Additional space of about 1.5 mm is also needed along each edge for the glue seal itself. For SLMs with small array sizes built on semiconducting wafers, the requirement of an additional 4 mm distance beyond the pixels on each side sharply reduces the number of Si substrates which can be built on a wafer and hence increases the cost of each SLM. It should also be mentioned that at least one edge of the SLM must extend beyond the glue seal area for electrical connections.

As an example, consider a VGA array (480×640) with 17 mm pixels. The array size is 8.16×10.88 mm and with the additional 4 mm per side, the chip is 16.16×18.88 mm. Further, one side needs to extend about 1.5 mm beyond the glue seal to provide an area for bonding, so the total chip size is 16.16×20.38 mm. This corresponds to an area of 329 mm2. Just in terms of area, a total of only 37 SLMs could be fit on a 125 mm wafer, assuming no wasted area due to the square chip.

SUMMARY OF THE INVENTION

Accordingly, this invention is a spatial light modulator having a silicon substrate on a backing plate, where the backing plate extends beyond the Si wafer on three sides. The Si substrate or wafer has the reflecting pixels. A glass cover is placed over the Si substrate on the backing plate and liquid crystal fills gap between the cover glass plate and the Si substrate. The liquid crystal is kept in place by a glue seal bead on the four edges of the cover glass plate.

In one embodiment of the invention, the glue sealant is placed only on one edge of the surface of the substrate so as to minimize the surface area on the silicon substrate that is needed.

In one embodiment of the invention the substrate is recessed into the back plate while in another embodiment the silicon substrate is raised above the surface of the back plate.

With the current invention, the chip extends 1 mm beyond the array on three sides to provide room for circuitry and wiring and 5.5 mm (2.5 mm array to glue seal, 1.5 mm glue seal, and 1.5 mm bonding area) beyond the array on the remaining side for electrical connections. This results in a chip size of 10.16×17.38 mm, or an area of 177 mm2. Dividing the area of a 125 mm wafer by this area results in a maximum number of chips per wafer of 69, or nearly twice as many as using the traditional glue seal method. This is equivalent to about a 50% cost reduction from the 329 mm2 described above.

DESCRIPTION OF THE PREFERRED EMBODIMENT

Figure 1:
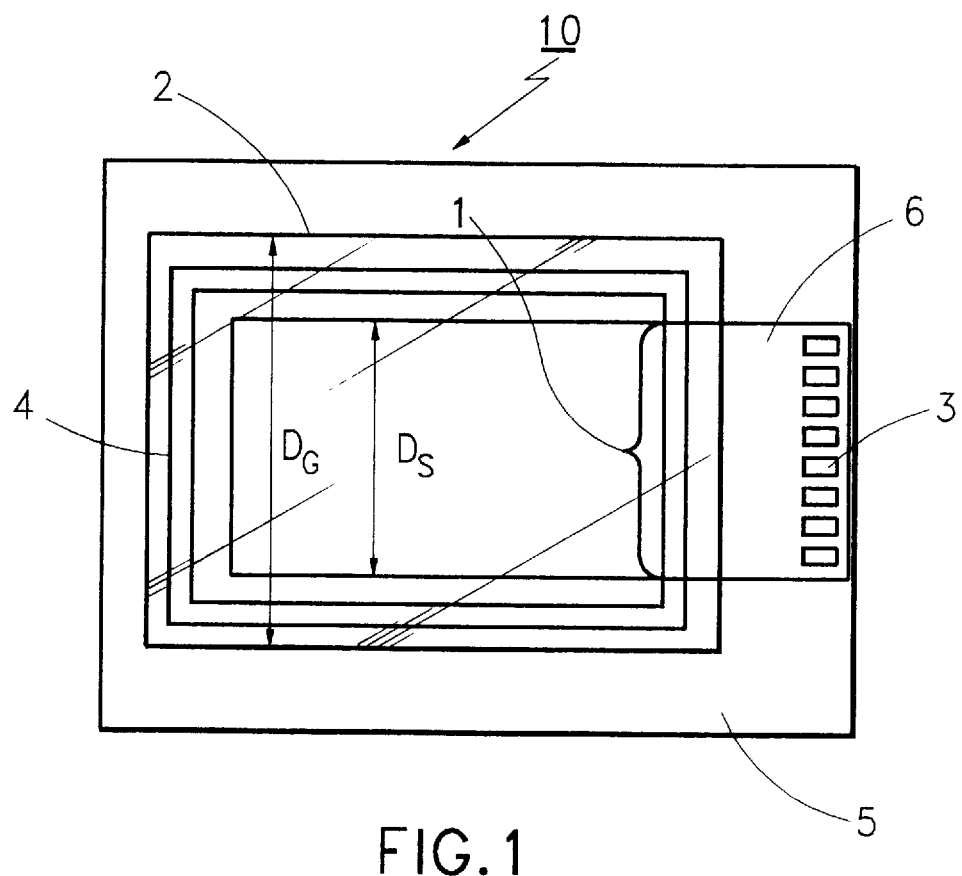
FIG. 1 is a top view of the spatial light modulator assembly according to the invention.
Figure 2:
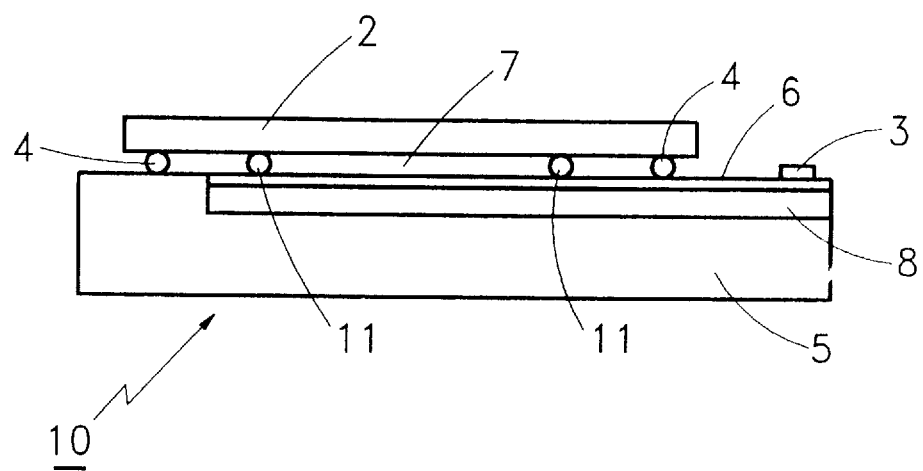
FIG. 2 is a schematic illustration of the side view of the spatial light modulator in accordance with the invention.

Shown in FIG. 1 is a top view and in FIG. 2 is the side view of spatial light modulator assembly 10 (SLM) according to the invention. Shown is backplate 5 which is recessed to accommodate the silicon substrate 6 which is attached to a supporting piece 8 which is typically made of glass and provides for rigidity for electrical connections. Also shown in FIG. 2 is top glass 2 which is attached over the backplate S with a glue seal 4 to form a cavity 7 which will contain an electro-optic material such as liquid crystal. Electrical interconnection pads 3 are shown along one edge of the silicon substrate and are used to electrically connect the silicon substrate to external electronics. Also shown in this figure are spacers 11 which are used to define and maintain the cell gap.

Shown in FIG. 1 is the plan view of the SLM 10 with one dimension Ds of the silicon substrate is being smaller than the corresponding dimension Dg of the top glass. Shown is glue seal 4 where the seal is in contact with only one edge 1 on the silicon substrate surface.

Figure 3:
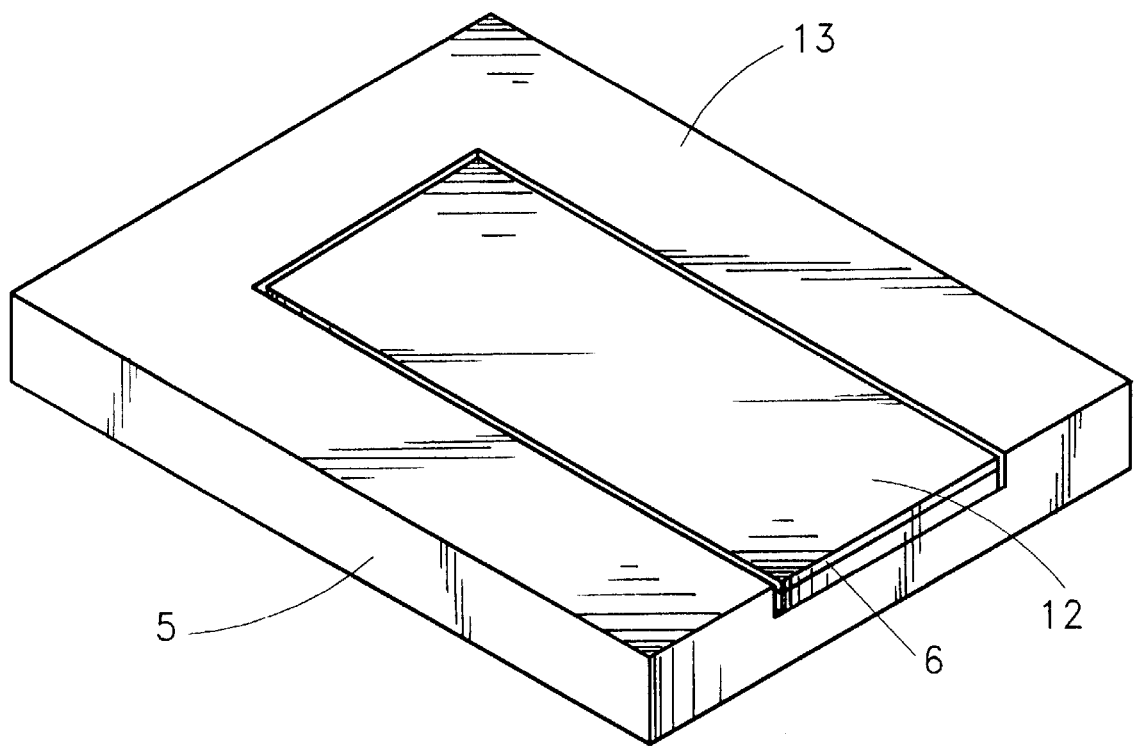
FIG. 3 graphically illustrates an embodiment of the invention where the silicon substrate is recessed into the back plate.

In this embodiment where the Si substrate is recessed into the backplate as shown in FIG. 3, the surface of the Si substrate 12 is approximately coplanar with the surface of the back plate 13. In this embodiment the volume of liquid crystal used is much less than in the case where the Si substrate sits on the backplate. In all embodiments pieces 5 and 8 can be combined into one piece.

In a typical assembly process, the Si is bonded to an optically flat glass plate. It is then coated with a polymer layer that is rubbed to facilitate the alignment of the liquid crystal to be filled later. The top glass which has the transparent electrode is also coated with the same polymer layer and rubbed for the alignment [2]. The Si assembly is then placed into the recess in the back plate. Spacer balls are then sprinkled over the Si substrate. These serve to define and control the cell gap between Si and the top glass plate. In lieu of spacer balls, insulating spacers can be directly fabricated on the Si substrate. The glue for the seal is then dispensed either on the top glass or on the Si/back plate assembly and the two pieces are mated to form the cell. A small gap, about 10 mm or so in length, is left unglued so that the liquid crystal may be injected into the cell. After the liquid crystal is filled through the gap, the fill gap is then sealed with an epoxy glue. This assembled cell is then annealed at 120 degrees Celsius for 30 minutes to complete the liquid crystal alignment.

For the electro-optic material, any material such as, for example, the following may be used: liquid crystal, ferro-electric liquid crystal, polymer dispersed liquid crystal, and polymer stabilized cholesteric texture liquid crystal.

The silicon substrate has on its surface thousands of individual pixels over an area as small as one square inch. Under each pixel there can be transistor circuitry to make the display an active matrix type (1). In one embodiment, each pixel has a reflecting metallic top layer that is used in conjunction with a counter electrode to apply electrical potentials to electro-optic material. The transparent top plate 2 has on its inside surface a transparent conducting layer that is the counter electrode for the metallic top layer of the pixels on the silicon substrate surface. The electric field thereby generated at each pixel is used to alter the electro-optic material above the pixel. When an appropriate potential is applied across a chosen pixel the electro-optic material locally, for example, changes either the polarization of the light going through it or changes from being transparent to being scattering. The bottom plate material can be, for example: a metal, ceramic, glass, or plastic.

The reinforcing plate 8 can be, for example: glass, ceramic, metal or plastic.

The top plate 2 can be, for example: glass or any transparent plastic.

The glue can be, for example: Ultra Violet (UV) curable adhesive or thermally curable adhesive material.

References [1] Thin Film Transistor/liquid crystal display technology—Introduction by W. E. Howard, IBM Journal of Research and Development, Vol. 36, No. 1, January 1992. [2] Flat Panel Displays and CRTs, Edited by L. E. Tarras, Jr., Pub. Van Nostrand Reinhold Co., NY, 1985, Chapter 11.

Having thus described our invention, what we claim as new and desire to secure by Letters Patents is:

1. A spatial light modulator, comprising:

a substrate structure comprising a backplate and a silicon substrate in contact with said backplate, said silicon substrate having at its surface an active array area between its edges and at least an electrical connection area at one end of said silicon substrate, and said backplate having edges which extend beyond all but said one end of said silicon substrate;

a transparent cover mounted above said substrate structure and extending beyond said active array area but not covering said electrical connection area;

electro-optic material between said transparent cover and said substrate structure over at least said active array area; and a sealant in contact with said transparent cover and said substrate structure so as to contain said electro-optic material, said sealant being in contact with said backplate and at most three edges of the active array area on the surface of said silicon substrate including the edge between said electrical connection area and said active array area.

2. A spatial light modulator as recited in claim 1, wherein said sealant is in contact with said backplate and at most one edge of the active array area on said surface of said silicon substrate, said at most one edge being between said active array area and said electrical connection area.

3. A spatial light modulator as recited in claim 1, wherein said silicon substrate is mounted on said backplate.

4. A spatial light modulator as recited in claim 1, further comprising:

a plurality of spacers for separating said transparent cover from said silicon substrate by a fixed distance.

5. An apparatus as recited in claim 1, wherein said electro-optic material is liquid crystal.

6. An apparatus as recited in claim 1, wherein said electro-optic material is twisted nematic liquid crystal.

7. An apparatus as recited in claim 1, wherein said electro-optic material is ferro-electric liquid crystal.

8. An apparatus as recited in claim 1, wherein said electro-optic material is polymer dispersed liquid crystal.

9. An apparatus as recited in claim 1, wherein said electro-optic material is polymer stabilized cholesteric texture liquid crystal.

10. A spatial light modulator, comprising:

a substrate structure comprising a backplate and a silicon substrate in contact with said backplate, said silicon substrate having at its surface at least an electrical connection area at one edge of said silicon substrate and an active array area;

a transparent cover mounted above said substrate structure and extending beyond said active array area but not covering said electrical connection area;

electro-optic material between said transparent cover and said substrate structure over at least said active array area; and a sealant in contact with said transparent cover and said substrate structure so as to contain said electro-optic material;

wherein said silicon substrate is recessed into said backplate.

11. An apparatus as recited in claim 10, wherein said electro-optic material is selected from the group consisting of liquid crystal, twisted nematic liquid crystal, ferro-electric liquid crystal, polymer dispersed liquid crystal, and polymer stabilized cholesteric texture liquid crystal.

12. A method of assembling a spatial light modulator, said method comprising:

forming a substrate structure by placing a silicon substrate having at its surface at least an electrical connection area at one edge and an active array area in a recess of a backplate so that a surface of said backplate and said surface of said silicon substrate are approximately coplanar;

providing a sealant between a transparent plate coated with a transparent electrical conducting material and said substrate structure such that said sealant is in contact with both said silicon substrate and said backplate; and filling a cavity formed between said transparent plate and said silicon surface with an electro-optic material wherein said electro-optic material covers at least said active array area but not said electrical connection area.

13. A method of assembling a spatial light modulator comprising:

forming a substrate structure by placing a silicon substrate having at its surface at least an electrical connection area at one edge and an active array area on a flat backplate;

placing spacers on said backplate about said silicon substrate to form a coplanar surface large enough to accommodate a transparent plate with a conducting layer;

placing said transparent plate on said spacers to cover at least said active array area but not said electrical connection area; and filling a cavity formed between said transparent plate and said silicon substrate with an electro-optic material, thereby forming said spatial light modulator.

14. A spatial light modulator comprising:

a substrate structure comprising a backplate and a silicon substrate in contact with said backplate, said silicon substrate having at its surface at least an electrical connection area at one edge of said silicon substrate and an active array area;

a transparent cover mounted above said substrate structure and extending beyond said active array area but not covering said electrical connection area;

electro-optic material between said transparent cover and said substrate structure over at least said active array area; and a sealant in contact with said transparent cover and said substrate structure so as to contain said electro-optic material;

and, wherein said back plate comprises a plurality of spacers to control the distance between said top glass and said silicon substrate.

15. An apparatus as recited in claim 14, wherein said electro-optic material is selected from the group consisting of liquid crystal, twisted nematic liquid crystal, ferro-electric liquid crystal, polymer dispersed liquid crystal, and polymer stabilized cholesteric texture liquid crystal.

16. A spatial light modulator as recited in claim 14, wherein said silicon substrate is mounted on said backplate.

17. A spatial light modulator as recited in claim 14, further comprising:

a plurality of spacers for separating said transparent cover from said silicon substrate by a fixed distance.

* * * * *